United States Patent
Quartarone et al.

(10) Patent No.: US 11,897,617 B2
(45) Date of Patent: Feb. 13, 2024

(54) PACK MANAGEMENT SYSTEM FOR ENVIRONMENTAL CONTROL SYSTEM

(71) Applicant: UNITED TECHNOLOGIES RESEARCH CENTER IRELAND LTD., Cork (IE)

(72) Inventors: Giusi Quartarone, Mayfield (IE); Lance R. Bartosz, Granby, MA (US); Catherine Thibaud, South Windsor, CT (US)

(73) Assignee: UNITED TECHNOLOGIES RESEARCH CENTRE IRELAND, Cork (IE)

(*) Notice: Subject to any disclaimer, the term of this patent is extended or adjusted under 35 U.S.C. 154(b) by 473 days.

(21) Appl. No.: 16/719,480

(22) Filed: Dec. 18, 2019

(65) Prior Publication Data
US 2021/0114736 A1   Apr. 22, 2021

(30) Foreign Application Priority Data
Oct. 16, 2019  (EP) .................................. 19203689

(51) Int. Cl.
*B64D 13/06* (2006.01)
(52) U.S. Cl.
CPC ...... *B64D 13/06* (2013.01); *B64D 2013/0688* (2013.01)
(58) Field of Classification Search
CPC ............ B64D 13/06; B64D 2013/0688; B64D 13/08; B64D 13/02; B64D 13/006; B64D 2013/0618; B64D 2013/0611; B64D 2013/064; B64D 2013/0644; B64D 2013/0655; B64D 2221/00; B64D 33/02; B64D 33/04; F02C 6/08
See application file for complete search history.

(56) References Cited

U.S. PATENT DOCUMENTS

| | | | | |
|---|---|---|---|---|
| 5,511,385 | A  * | 4/1996 | Drew ..................... | B64D 13/06 62/402 |
| 7,000,425 | B2 * | 2/2006 | Army, Jr. ............... | B64D 13/06 62/401 |
| 7,871,038 | B2 | 1/2011 | Space et al. | |
| 8,571,726 | B2 | 10/2013 | Gray et al. | |
| 9,884,281 | B2 | 2/2018 | Fox et al. | |
| 9,957,051 | B2 | 5/2018 | Bruno et al. | |

(Continued)

FOREIGN PATENT DOCUMENTS

| EP | 0794898 B1 | 1/1999 |
|---|---|---|
| EP | 2378086 A2 | 10/2011 |
| EP | 2602191 A1 | 6/2013 |

OTHER PUBLICATIONS

European Search Report for Application No. 19203689.5, dated Apr. 9, 2020, 7 pages.

*Primary Examiner* — Gordon A Jones
(74) *Attorney, Agent, or Firm* — CANTOR COLBURN LLP

(57) ABSTRACT

An air conditioning pack management system for controlling distribution of a predetermined amount of conditioned air from a system comprising two or more air conditioning packs, the pack management system comprising a management unit arranged to proportion the predetermined amount of conditioned air to be provided by one or more of the two or more packs based on the respective operating efficiencies of the packs or other pre-selected metrics.

9 Claims, 2 Drawing Sheets

Traditional Pack – Normal Mode

(56) References Cited

U.S. PATENT DOCUMENTS

| | | |
|---|---|---|
| 9,957,052 B2 | 5/2018 | Fox et al. |
| 11,573,130 B2* | 2/2023 | McBrien .................. G01K 3/14 |
| 2007/0113579 A1 | 5/2007 | Claeys et al. |
| 2017/0349290 A1* | 12/2017 | Linert .................... B64D 13/06 |
| 2019/0309683 A1* | 10/2019 | Mackin .................. B64D 15/04 |
| 2020/0002009 A1* | 1/2020 | Quartarone ............ B64D 13/08 |

* cited by examiner

Traditional Pack – Normal Mode

Traditional Pack – Failure Mode

*Packs sized for failure flow* aECS Pack – Normal Mode aECS Pack – Failure Mode

*Packs size benefits from reduced failure flow reqt*

PACK MANAGEMENT SYSTEM FOR ENVIRONMENTAL CONTROL SYSTEM

CROSS-REFERENCE TO RELATED APPLICATIONS

This application claims the benefit of European Application 19203689.5 filed Oct. 16, 2019, the disclosure of which is incorporated herein by reference in its entirety.

TECHNICAL FIELD

The present disclosure is concerned with controlling operation of air conditioning packs in environmental control systems (ECS) e.g., but not exclusively, in aircraft.

BACKGROUND

Closed spaces are often desired or required to have controlled environments, in terms of air temperature, pressure and flow, for reasons of safety, health, comfort or other reasons. Environmental control systems are known to regulate the air in such spaces.

In aircraft, for example, it is important, for passenger health, safety and comfort, that the air in the cabin and cockpit as well as other areas of the aircraft, is controlled to an appropriate temperature, pressure, air flow and air velocity, and level of oxygen. Contaminants are optionally filtered through HEPA and adsorption filters.

An ECS includes one or more sources of compressed air, one or more air conditioning packs, a distribution system and control units to maintain cabin temperature, pressure and air flow at proper levels. The air can be compressed by the engine (known as a bleed system) or by an electric compressor (an electric system). The air can also be compressed by an auxiliary power unit (APU) or provided by the ground maintenance services.

The air conditioning pack is an air cycle refrigeration system that reduces the temperature and pressure of the compressed air. The air conditioning is performed by turbines in combination with a compressor machine, as well as valves for temperature and flow control, and heat exchangers that use outside air. (RAM air) to reduce the temperature of the compressed air. An air cycle refrigeration system is usually designed to operate at maximum efficiency at nominal (i.e. normal) air flow.

Different numbers of air conditioning packs are provided in different types of aircraft with packs providing air to different cabin compartments or parts of the aircraft. The number of air conditioning packs in a bleed system ECS generally corresponds to the number of engines. A twin-engine aircraft would then generally have two air conditioning packs each arranged to provide half of the total flow of external air. For a three-engine aircraft, one air conditioning pack may provide redundancy. For a four-engine aircraft, each air conditioning pack might provide a quarter of the total outside air flow. For electric systems, e.g., two packs may be installed each fed by one or two electric compressors.

Generally, all air conditioning packs in an aircraft have the same size and, under normal operation, condition the same amount of outside air flow.

Further, each pack is designed to be 'oversized' so as to be able to provide a maximum air flow of around 120% of the nominal air flow in case of failure of another pack.

As mentioned above, though, each pack is designed to operate at maximum efficiency at nominal air flow. If, for any reason, the air flow should be different from the nominal air flow, the pack will not be operating at its maximum efficiency.

Currently, the FAA prescribes that 0.25 kg of conditioned air per minute must be provided for each passenger.

The ECS of an aircraft is generally the most energy-demanding of all the aircraft sub-systems. This energy is mainly used to compress the outside air to a suitable level for the cabin environment. Typically, ECSs combine outside air and recirculated air from the cabin in approximately equal amounts. Energy savings can be achieved by reducing the external air flow and increasing the recirculation flow.

The 'adaptive' environmental control system (aECS) aims to reduce the amount of fresh air flow brought into the cabin so as to reduce the amount of energy consumed by the ECS. The aECS is similar in terms of components to the known ECS, including the compressed air sources and air conditioning packs described above, but can optionally include air sensing and filtration technologies and an air quality controller to control and maintain the cabin air conditions to an optimal level. If, needed, the aECS should be able to revert to FAA flow requirements.

Again, using the aECS, if less than the nominal air flow is required or provided, whilst there will be energy savings, the air conditioning units will not be operating at maximum efficiency.

It would be desirable, therefore, to provide control of an ECS that optimises the use of the air conditioning packs to improve efficiency of the system.

SUMMARY

According to one aspect of the disclosure, there is provided an air conditioning pack management system for controlling distribution of a predetermined amount of conditioned air from a system comprising two or more air conditioning packs, the pack management system comprising a management unit arranged to apportion the predetermined amount of conditioned air to be provided by one or more of the two or more packs based on the respective operating efficiencies of the packs.

According to another aspect, there is provided an environmental control system comprising: one or more sources of compressed air to be distributed within a space; two or more air conditioning packs to condition air from the source(s) of compressed air for distribution into the space; and a pack management system to determine the proportion of the total amount of air to be distributed that is conditioned by each of one or more of the air conditioning packs depending on the operating efficiencies of the packs.

According to another aspect, there is provided a method of controlling an environment control system comprising apportioning an amount of air to be distributed by the system between one or more of two or more available air conditioning packs based on the total amount of air to be distributed and the operating efficiencies of the packs.

The available number of packs can vary according to the application for the system and may be two, three, four or more.

The apportionment may be based on, e.g., air quantity or air flow rate.

In a preferred embodiment, the apportioning may be based on the solution of an optimisation problem taking into account the total amount of air to be distributed, the respective efficiencies of the available packs and the system stability.

The air flow may be apportioned between the packs such that not all available packs are used to provide conditioned air, e.g. if the total amount of air can be provided by fewer than all of the packs, operating at closer to their optimised efficiency.

BRIEF DESCRIPTION OF THE DRAWINGS

Preferred embodiments will be described by way of example only, with reference to the drawings in which.

DETAILED DESCRIPTION

Figure 1A:
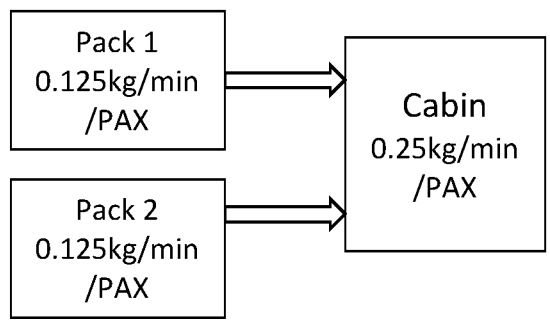
FIGS. 1A and 1B show, schematically, a traditional air conditioning pack system in normal mode (FIG. 1A) and in failure mode (FIG. 1B)

An example of a typical operation of an ECS will first be described with reference to FIGS. 1A and 1B.

Such a system would typically be designed to operate according to the FAA requirements mentioned above. For this example, therefore, we assume that the ECS is required to provide 0.25 kg/min/passenger of fresh air to the cabin 1. The example shown has two air conditioning packs 2, 3 that receive and condition compressed air from the compressed air source (engine or electric compressor—not shown) for supplying to the cabin 1. The air conditioning packs in conventional systems are all the same size and, therefore, in normal conditions, each would provide around 50% of the outside air—i.e. 0.125 kg/min/passenger as shown in FIG. 1A. Each pack is operating at its maximum efficiency.

Figure 1B:
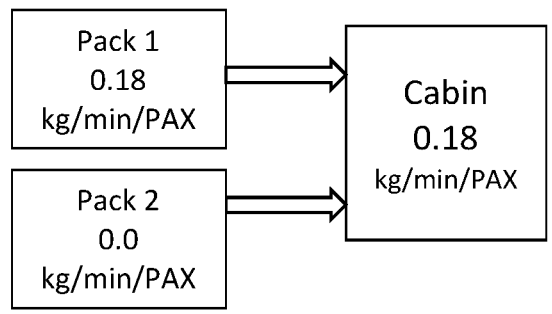

If, however, one of the packs fails (pack 3 in FIG. 1B) and thus provides no outside air to the cabin 1, then the additional or reserve capacity of the other pack, 2, will kick in so that pack 2 will provide 0.18 kg/min/passenger as prescribed by FAA in failure mode (FIG. 1B). This pack 2 is then no longer operating at its maximum efficiency; however this is allowed since the system is in failure condition.

A similar situation can arise in the aECS, in the situation that the controller determines that a reduced input air flow is required based on measurements made in the cabin 1. Say, for example, the air quality controller of the aECS (not shown) commands a flow control valve to reduce the external airflow to 0.1 kg/min/passenger. Again, this would be split equally between the two packs each providing 0.05 kg/min/passenger—i.e. less than 50% of its nominal flow. Again, therefore, each pack would be operating at less than its maximum efficiency.

Figure 2A:
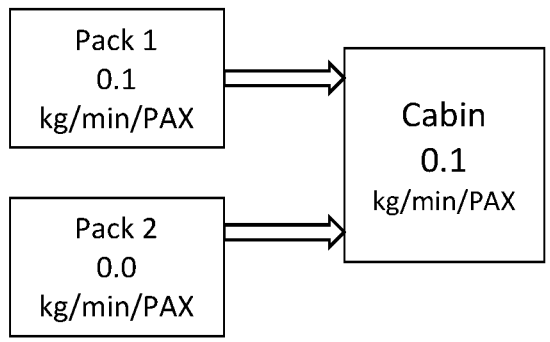
FIGS. 2A and 2B show, schematically, an air conditioning pack system controlled according to this disclosure in normal mode (FIG. 2A) and in failure mode (FIG. 2B).

In order to maximise the operating efficiency of the system, according to the present disclosure, a pack management system controls how the required outside air flow is proportioned between two or more air conditioning packs. In the scenario above, for example, the 0.1 kg/min/passenger could be provided by just one of the air conditioning packs, with the other switched off. The enabled pack would then be operating much closer to its maximum efficiency that if the desired flow were split equally between the two packs. This example is shown in FIG. 2A.

Figure 2B:
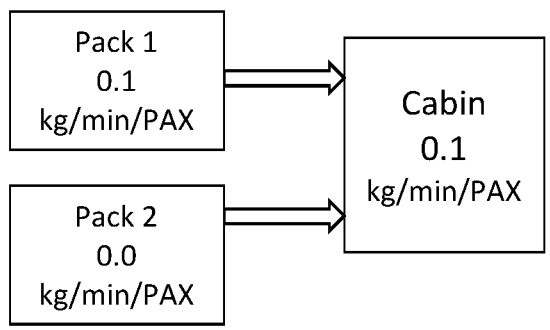

Similarly, if one of the packs in the aECS fails, the required air flow can be provided by the operable pack as shown in FIG. 2B. If required, the operating pack in the aECS system can revert to provide the air flow prescribed by FAA (i.e. 0.18 kg/min/PAX).

The proposed methodology can be applied to ECS capable of modulating the external air flow (namely aECS). This capability might be retrofitted to existing ECS architectures; therefore, the above is merely an example and the concept could be applied to existing and new ECS designs. With existing ECS designs, the idea eliminates the need to resize the packs since the operative pack conditions can be controlled by the pack management system to be closer to the nominal operating condition. It is also possible for the aECS to revert to FAA requirement operation if needed. It is also conceivable that FAA requirements will change with the acceptance of aECS systems and air sensing and filtration technologies. The present system could still be applied to any newly developed ECSs due to such FAA changes, which could result in smaller packs. Further, the example given has only shown a system with two packs. The concept can also be applied to systems having any other number of packs.

In summary, the system of this disclosure makes a determination as to how a total given air flow quantity will be conditioned using more packs selected from two or more air conditioning packs by selecting the inlet air flow of one or more of the packs based on the efficiency of the packs, with the aim of maximising the packs' efficiency and ensure that the outlet air flow meet also the pressure and temperature requirements. Thus, depending on the total desired air flow, the pack management system can split the air flow unequally between the two or more packs such that one provides a greater proportion of the desired total air flow than the other/another. In some circumstances, all of the total air flow could be provided by just one of the two or more packs.

The total flow provided indicated in the FIGS. 2A and 2B represents an example and this value will vary depending on the level of adaptation of the external air flow. Furthermore, although the figures depict an example with two packs in total, this invention can be applied to different system architecture with a different number of packs.

Various factors may be taken into account by the pack management system in allocating the air flow between packs, including the efficiencies of the packs. In one example, the pack management system may operate by solving an optimisation problem whose objective may be to maximise the efficiency of the packs while guaranteeing a total given outside air flow and also ensure e.g. that the aircraft system is stable (e.g. different bleed air intake from the engines should not negatively compromise the aircraft system). Other factors may be taken into account. In some examples, the ECS may be used in spaces other than aircraft and so the engine stability issue may be less important.

In one example of an optimisation problem the pack management might solve to determine the distribution, the efficiencies of the available packs are taken into account as is the total desired intake air and system stability and the optimisation problem may be:

The optimization problem solved by the pack management system could be:

$$\begin{bmatrix} \dot{m}_1 \\ \dot{m}_2 \\ \vdots \\ \dot{m}_{Npacks} \end{bmatrix} = \max_{[\cdot]} \sum_{i=1}^{N_{packs}} \eta_i$$

S.t
1. $\Sigma_{i=1}^{N_{packs}} \dot{m}_i = \dot{m}_{TOT}$
2. system stability

Where:

$\eta_i$ is the efficiency of the i-th pack.

$\dot{m}_i$ is an optimization variable that corresponds to the inlet external airflow to the i-th pack.

$\dot{m}_{TOT}$ is the total external mass air flow that is controlled by aECS controller The resolution of this problem assumes knowledge of each pack's efficiency map at different operative points. Each pack's efficiency map depends on its components' design, architecture and size. If the efficiency is not known, the optimisation problem could be solved using other factors relevant to the packs' operation.

Advantages of this system include higher system efficiency at reduced outside air flow, that the packs operate within their operative range, that there is no need to resize packs to accommodate reduced air flows and/or to install additional packs, that the concept can be applied to as yet undeveloped packs and system requirements, and operating flexibility is improved.

The described embodiments are by way of example only. The scope of this disclosure is limited only by the claims.

What is claimed is:

1. An air conditioning pack management system for controlling distribution of a predetermined amount of conditioned air from a system comprising two or more air conditioning packs, the pack management system comprising a management unit arranged to apportion the predetermined amount of conditioned air to be provided by one or more of the two or more air conditioning packs based on pre-selected metrics, wherein the pre-selected metrics include the respective operating efficiencies of each of the two or more air conditioning packs, and wherein, depending on the predetermined amount of conditioned air, and based on the pre-selected metrics including the respective operating efficiencies of each of the two or more air conditioning packs relative to their maximum operating efficiencies, the pack management system is configured to apportion the predetermined amount of conditioned air unequally between the two or more air conditioning packs such that one of the two or more air conditioning packs provides a greater proportion of the predetermined amount of conditioned air that the other/another of the two or more air conditioning packs so to maximize the efficiency of each of the two or more air conditioning packs;

pack management system apportions by solving an optimization problem:

$$\begin{bmatrix} \dot{m}_1 \\ \dot{m}_2 \\ \vdots \\ \dot{m}_{Npacks} \end{bmatrix} = \max \sum_{i=1}^{N_{packs}} \eta_i$$

s.t.

1. $\sum_{i=1}^{N_{packs}} \dot{m}_i = \dot{m}_{TOT}$ 2. system stability

Where:

$\eta_i$ is the efficiency of the i-th pack;

$\dot{m}_i$ is an optimization variable that corresponds to the inlet external airflow to the i-th pack; and $\dot{m}_{TOT}$ is the total external mass air flow.

2. The air conditioning pack management system of claim 1, wherein the management unit apportions all of the predetermined amount to one of the two or more air conditioning packs.

3. The air conditioning pack management system of claim 1, wherein the pack management system is configured to apportion the predetermined amount of conditioned air to be provided by the one or more of the two or more air conditioning packs according to quantity of air provided or rate of air provided.

4. An environmental control system comprising:

one or more sources of compressed air to be distributed within a space;

a pack management system as recited in claim 1 to determine the portion of the total amount of air to be distributed that is conditioned by each of one or more of the air conditioning packs depending on pre-selected metrics, wherein the two or more air conditioning packs are arranged to condition air from the source(s) of compressed air for distribution into the space.

5. The environmental control system of claim 4, wherein the pre-selected metrics include the respective operating efficiencies of the two or more air conditioning packs.

6. The environmental control system of claim 4, wherein the pack management system is arranged to apportion based on the solution of an optimization problem taking into account the predetermined amount of conditioned air, the efficiencies of the two or more air conditioning packs and stability of the system.

7. The environmental control system of claim 4, wherein all of the predetermined amount is apportioned to one of the two or more air conditioning packs.

8. The environmental control system of claim 4, wherein the pack management system is configured to apportion the predetermined amount of conditioned air to be provided by the one or more of the two or more air conditioning packs according to quantity of air provided or rate of air provided.

9. The environmental control system of claim 4, wherein the environmental control system is on an aircraft.

* * * * *